United States Patent [19]

Nishiguma et al.

[11] Patent Number: 5,200,794
[45] Date of Patent: Apr. 6, 1993

[54] OPTICAL HEAD FOR AN OPTICAL AUTHENTICITY IDENTIFING SYSTEM

[75] Inventors: Hiroaki Nishiguma; Hidekazu Hosino; Yoshiaki Seki, all of Kanagawa, Japan

[73] Assignee: NHK Spring Co., Ltd., Yokohama, Japan

[21] Appl. No.: 782,976

[22] Filed: Oct. 24, 1991

Related U.S. Application Data

[63] Continuation-in-part of Ser. No. 547,936, Jul. 3, 1990, abandoned.

[30] Foreign Application Priority Data

Aug. 11, 1989 [JP] Japan .................................. 1-209065
Aug. 11, 1989 [JP] Japan .................................. 1-209066
Aug. 11, 1989 [JP] Japan .................................. 1-209067
Aug. 11, 1989 [JP] Japan .................................. 1-209068
Nov. 30, 1989 [JP] Japan .................................. 1-311422

[51] Int. Cl.$^5$ .................................................. G06K 7/10
[52] U.S. Cl. ................................... 356/71; 250/208.6
[58] Field of Search ............ 356/71; 250/208.3, 208.6; 369/44.12, 44.41, 44.42, 112, 44.14

[56] References Cited

U.S. PATENT DOCUMENTS

| | | | |
|---|---|---|---|
| 3,979,588 | 9/1976 | Park ............................ | 369/44.14 X |
| 4,034,211 | 7/1977 | Horst et al. .................. | 356/71 X |
| 4,129,382 | 12/1978 | Greenaway ................... | 356/71 |
| 4,163,570 | 8/1979 | Greenaway ................... | 356/71 X |
| 4,211,918 | 7/1980 | Nyfeler et al. ................ | 356/71 X |
| 4,501,439 | 2/1985 | Antes ............................ | 356/71 X |
| 4,537,504 | 8/1985 | Baltes et al. .................. | 356/71 |
| 4,544,266 | 10/1985 | Antes ............................ | 356/71 |
| 4,794,585 | 12/1988 | Lee ................................ | 369/44.23 X |

FOREIGN PATENT DOCUMENTS 60-227147  11/1985  Japan ................................. 356/73.1

Primary Examiner—Vincent P. McGraw
Attorney, Agent, or Firm—Baker & Daniels

[57] ABSTRACT

A highly simple and compact optical head for optically determining authenticity of an article by impinging a light beam upon an identification region provided on the article and having a selected reflective directivity, and receiving light reflected by the identification region. The identification region may consist of a holograph, a diffraction grating or a multiplicity of parallel grooves. The optical head comprises a light emitting element fixedly secured to a casing and a light receiving element placed coaxially in a light path of a light beam emitted from the light emitting element and having an opening for allowing the light beam to pass through the light receiving surface facing away from the light emitting element and being divided into a plurality of sectors defined around an axial center line of the light emitting element with each of the sectors being capable of individually detecting a magnitude of light impinging thereon.

10 Claims, 10 Drawing Sheets

OPTICAL HEAD FOR AN OPTICAL AUTHENTICITY IDENTIFING SYSTEM

TECHNICAL FIELD

This is a continuation-in-part of U.S. Pat. Application Ser. No. 07/547,936 filed Jul. 3, 1990, which is now abandoned.

The present invention relates to a system for determining or identifying authenticity of information storage cards by means of a reader/writer to prevent unauthorized fabrication and alteration of such cards. The information storage cards include, not exclusively, magnetic cards, IC cards, optical cards and so on which are capable of exchanging information with reader/writers. The present invention also relates to such cards provided with an identification region which cannot be easily duplicated but can be easily identified without requiring any undue complication of the card reader/writers.

BACKGROUND OF THE INVENTION

Conventionally, to the end of preventing the forgery of, for instance, a magnetic card, it has been practiced to use a laminated structure for its magnetic layer, and to punch holes in the magnetic card when the magnetic card is not intended for repeated use. However, such structures can be duplicated and deceived by the forgers with relative ease, and may not be sufficient to discourage attempts to illegally duplicate and alter the card. The internal structure of the card may be made more complex by known means, but it will lead to the complication and cost increase of the reader/writers for reading and writing information into and out of the card.

Additional problem which is expected to be encountered in preventing forgery of such information storage cards is that a forger may obtain an information storage card which has been totally spent and discarded and, since the remaining value of the card is recorded as part of its information, the forger may attempt to rewrite the information stored in the card with deceitful intent. In this case, it is not possible to prevent illegal or unauthorized use of the card by any ordinary means.

SUMMARY OF THE INVENTION

In view of such problems of the prior art, a primary object of the present invention is to provide a system for determining authenticity of an information storage card by certain identification means which is hard to duplicate for any unauthorized person but can be easily identified with a card reader/writer without increasing its complexity.

A further primary object of the present invention is to provide an optical head for optically determining authenticity of an article by impinging a light beam upon an identification region provided on the article and having a selected reflective directivity, and receiving light reflected by the identification region, which is highly compact in structure.

A second object of the present invention is to provide a system for determining authenticity of an information storage card which prevents unauthorized rewriting of the information carried by an authentic card with deceitful intent.

A third object of the present invention is to provide an information storage card which is suitable for use in such a system.

A fourth object is to provide such an optical head which is economical to manufacture.

These and other objects of the present invention can be accomplished by providing a system for determining authenticity of an information storage card comprising an information carrier which can store information in coded form so as to be accessed by a card reader/writer: the card carrying, in addition to the information carrier, an identification region having a unique optical property thereon: the reader/writer comprising: light emitting mean for projecting incident light upon the identification region carried by the card; light receiving means for detecting light reflected by or transmitted through the identification region; and identification circuit for evaluating the light received by the light receiving means and producing a signal for indicating authenticity of the card. The identification region may consist of a surface having a special reflective directivity as opposed to normal mirror reflection and diffused reflection.

Thus, the forgery of such cards is made significantly more difficult than was heretofore since the analysis and duplication of the identification region which may consist of a region having unique reflective or transmissive optical properties such as holograph, diffraction grating and a multiplicity of parallel grooves may be made difficult to a desired extent. However, identification of authenticity of the card can be carried out without increasing the complexity of the process of identifying the card since it can be accomplished simply by provision of one or more photosensitive light receiving means.

Still further, the objects of the present invention can be accomplished by providing such an optical head comprising: an annular casing defining a central bore therein; a light emitting element received coaxially at one end of the central bore with a light emitting surface thereof facing interior of the central bore; a lens provided in an intermediate part of the central bore; and a light receiving element provided at an other end of the central bore remote from the one end with a light receiving surface thereof facing away from the light emitting element, the light receiving element being provided with a central opening for allowing a light beam emitted from the light emitting element to pass through; the light receiving surface of the light receiving element being divided into a plurality of sectors arranged around the central opening with each of the sectors being capable of individually detecting a magnitude of light impinging thereon.

The optical head may have an extremely simple structure, and in particular because the light receiving element having a plurality of individual segments can be fabricated as a single device, for instance a monolithic device, the overall size of the optical head can be minimized. It is particularly advantageous in applications where space restrictions are severe and the height of the optical sensor is quite restricted.

In order to increase the complexity of the identification region to more effectively discourage any attempts to duplicate such an identification region, the identification region may consist of a plurality of parts which may have different reflective properties, or may be capable of reflecting incident light in a plurality of directions. Even when a single holograph identification region is used, if the incident light from the light emitting means involves two wave lengths, the holograph region may be capable of reflecting the incident light in two directions.

The actual process of determining or identifying the authenticity of the card can be accomplished by detecting the intensity of light received by the light receiving means which may consist of a simple device such as a photodiode. If the reflected light is split into a plurality of directions, a corresponding number of light receiving parts will be necessary. According to a preferred embodiment of the present invention, the light receiving parts are arranged around the light emitting means along a common circle centered around the light emitting means. According to another embodiment of the present invention, the light receiving parts are arranged around the light emitting means along at least two concentric circles concentric to the light emitting means.

Particularly when the card is such a card which stores a certain value which diminishes with the use of the card for purchasing goods or obtaining services, it is desired to prevent the illegal use of a spent discarded card by rewriting the information carried by the card to indicate the value left in the card. According to yet another embodiment of the present invention, such an illegal use of a spent card is prevented by punching out, melting or otherwise destroying the identification region. If the identification region consists of a plurality of parts it is possible to destroy them sequentially, for instance according to the extent of its depreciation. Alternatively, selective destruction of different parts of the identification region may be used to code a desired information into the card.

The present invention also provides information storage cards comprising: an identification region having a unique optical property which may be detected by an optical sensor so that it may be used in the aforementioned system.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
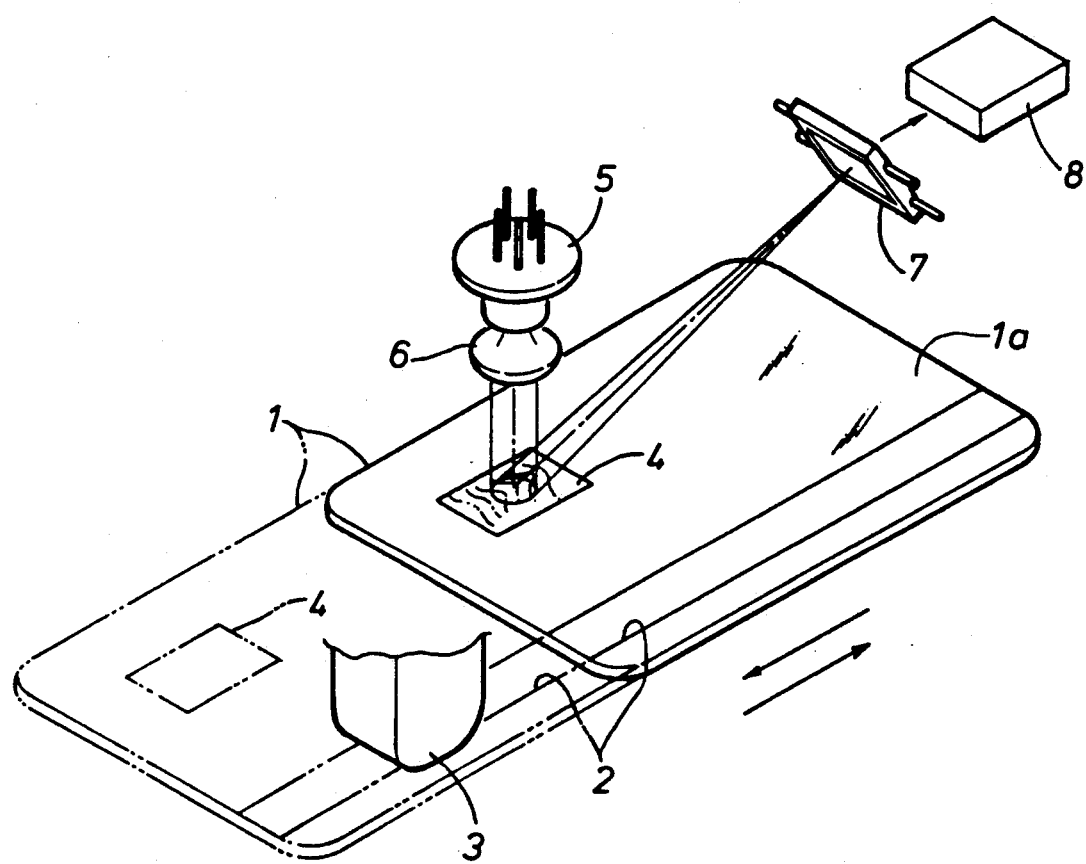
FIG. 1 is a perspective view of a card and an essential part of a card reader/writer according to a first embodiment of the card authenticity determining system according to the present invention.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

FIG. 1 showing a first embodiment of the present invention is a schematic perspective view of a magnetic card 1 which is being processed by a card reader/writer having means for identifying the authenticity of the card. The card 1 is conveyed in the direction indicated by the arrows or substantially laterally as seen in FIG. 1 by means of conveyer rollers or the like not shown in the drawings, and a magnetic head 3 writes into and reads out of a magnetic strip 2 provided on a major surface 1a of the card 1 when it has reached such a position.

A holograph region 4 is provided on a suitable location of the major surface 1a of the card 1. This holograph region 4 consists of a reflective holograph having such a reflection property that incident light having a certain wave length and projected perpendicularly upon the holograph is reflected in a certain prescribed direction.

The reader/writer is provided with a light emitting element 5 as a means for projecting laser light perpendicularly upon the major surface 1a of the card 1, in particular upon the holograph region 4, from a certain distance away therefrom. A lens 6 is interposed between the holograph region 4 and the light emitting element 5 to convert the light emitted from the light emitting element 5 into a parallel beam of light directed upon the holograph region 4. Further, a light receiving element 7 consisting of a photodiode is disposed at a position for receiving the light emitted from the light emitting element 5 and reflected by the holograph region 4. An identification circuit 8 is connected to the light receiving element 7 to determine the authenticity of each card.

In carrying out such a card identification process, the card 1 inserted in the card reader/writer is retained perpendicularly to the illuminating light beam from light emitting element 5, and the illuminating light or the incident light from the light emitting element 5 is projected upon the holograph region 4. The authenticity of the card 1 can be identified when the light reflected by the holograph region 4 is collected by the light receiving element 7, and its intensity is detected to be of a certain level by the identification circuit 8. Therefore, even when a forger obtained such a card, not only it would be difficult for him to analyze and duplicate the holograph but also a significant cost is required to fabricate an identical holograph. Thereby, it offers a strong discouraging effect upon potential forgers.

Figure 2:
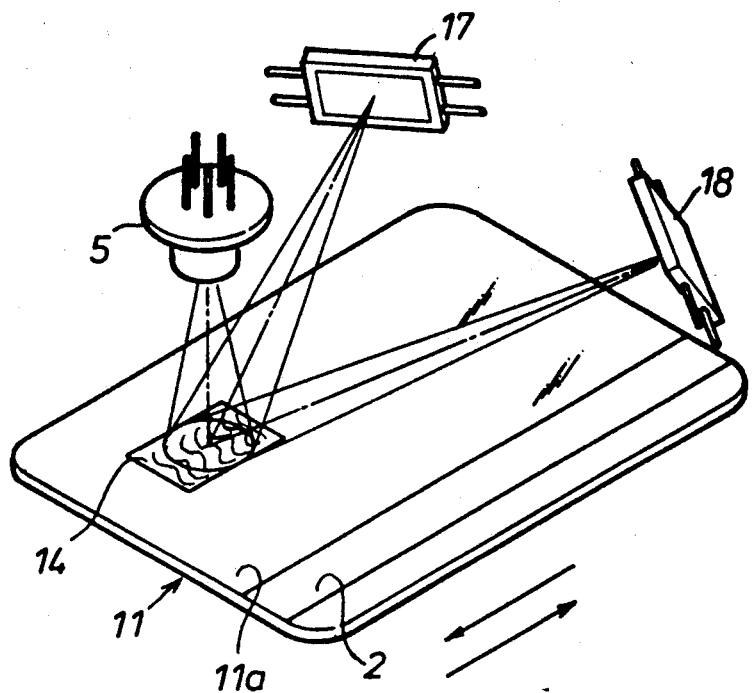
FIGS. 2 and 3 are similar perspective views showing second and third embodiments of the present invention, respectively, employing holograph regions.

FIG. 2 is a view similar to FIG. 1 showing a second embodiment of the present invention, and like parts in these drawings are denoted with like numerals without repeating detailed description thereof. Also, it should be understood that in the following disclosure some of the parts of the system such as the magnetic head 3 and the identification circuit 8 are not illustrated to avoid crowding of the drawings.

According to this embodiment, a holograph region 14 provided on a major surface 11a of a card 11 reflects and directs the light emitting from a light emitting element 5 to two points. Light receiving elements 17 and 18 are provided in the positions of the card reader/writer corresponding to these points. The incident light from the light emitting element 5 consists of simple diverging light in this case, but may also consist of a parallel beam of light. According to this embodiment, the illuminating light issued from the light emitting element 5 and projected upon the holograph region 14 is received by the light receiving elements 17 and 18, and the card 11 is identified to be authentic only when the intensities of the light received by the light receiving elements 17 and 18, respectively, are both higher than a certain prescribed level. Therefore, this embodiment is even more effective than the first embodiment in preventing forgery of the card. This embodiment is otherwise similar to the first embodiment.

Figure 3:
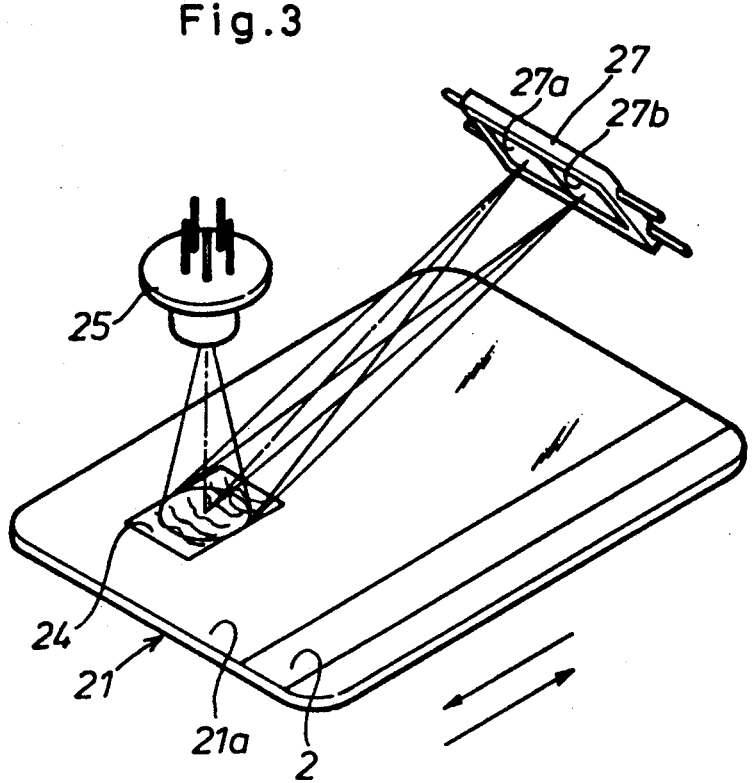

FIG. 3 is a view similar to FIGS. 1 and 2 depicting a third embodiment of the present invention. In this embodiment, the light emitting element 25 incorporates therein a pair of light sources having different wave lengths, and for instance may consist of a device including a plurality of chips such as a two wave length laser device having two light emitting surfaces in a single package. The holograph region 24 provided on the major surface 21a of the card 21 is likewise designed to converge light upon two different points according to the difference in wave length. Further, the light receiving element 27, for instance, consists of a divided diode and is provided with a pair of light receiving surfaces 27a and 27b which are located so as to correspond to the two points upon which the light converges. Thus, according to this embodiment, the illuminating light issued from the light emitting element 25 and projected upon the holograph region 24 is received by the respective light receiving surfaces 27a and 27b, and the card 21 is identified to be authentic only when the intensities of the light received by the light receiving surfaces 27a and 27b, respectively, are both higher than a certain prescribed level. This embodiment is otherwise similar to those depicted in FIGS. 1 and 2.

Figure 4:
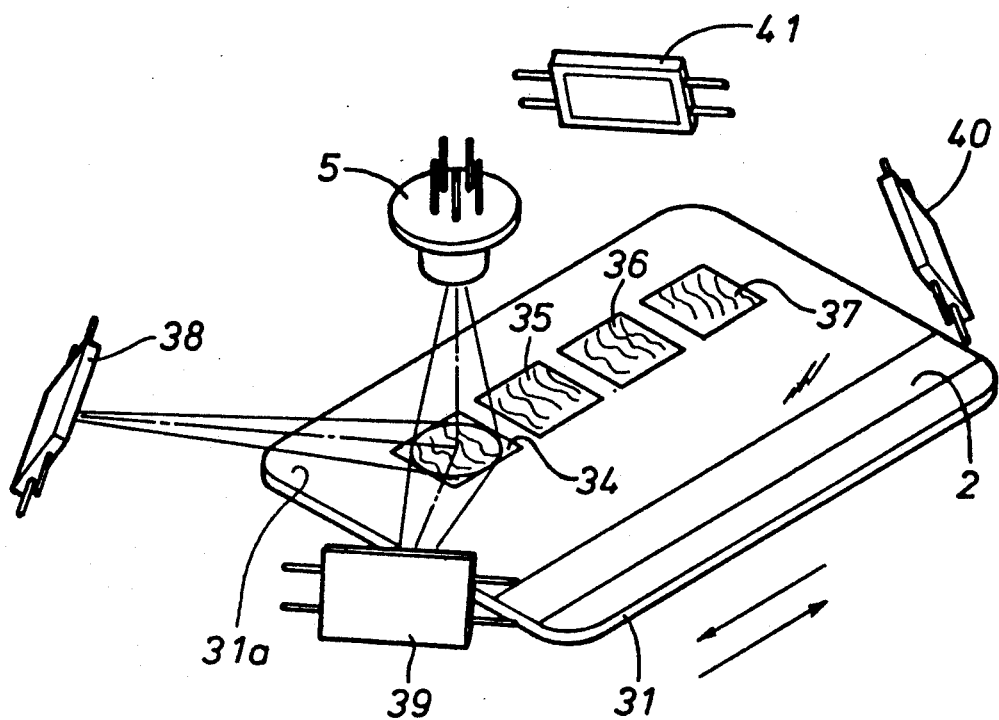
FIGS. 4 and 5 are similar perspective views showing a fourth embodiment of the present invention in two different conditions.
Figure 5:
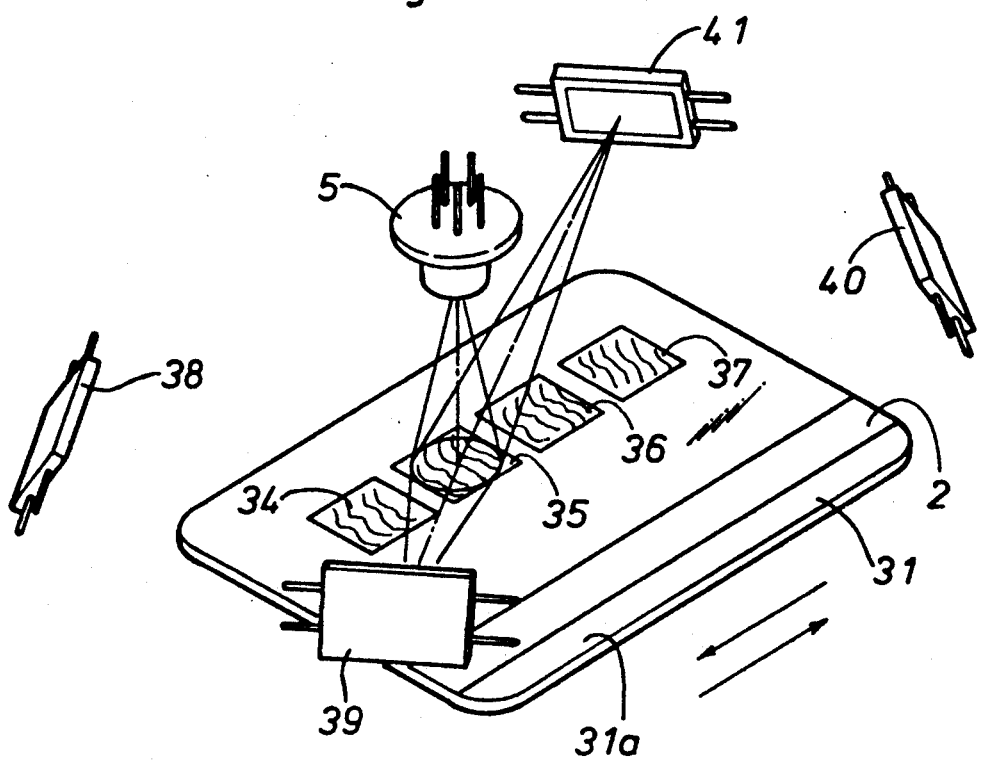
Figure 6:
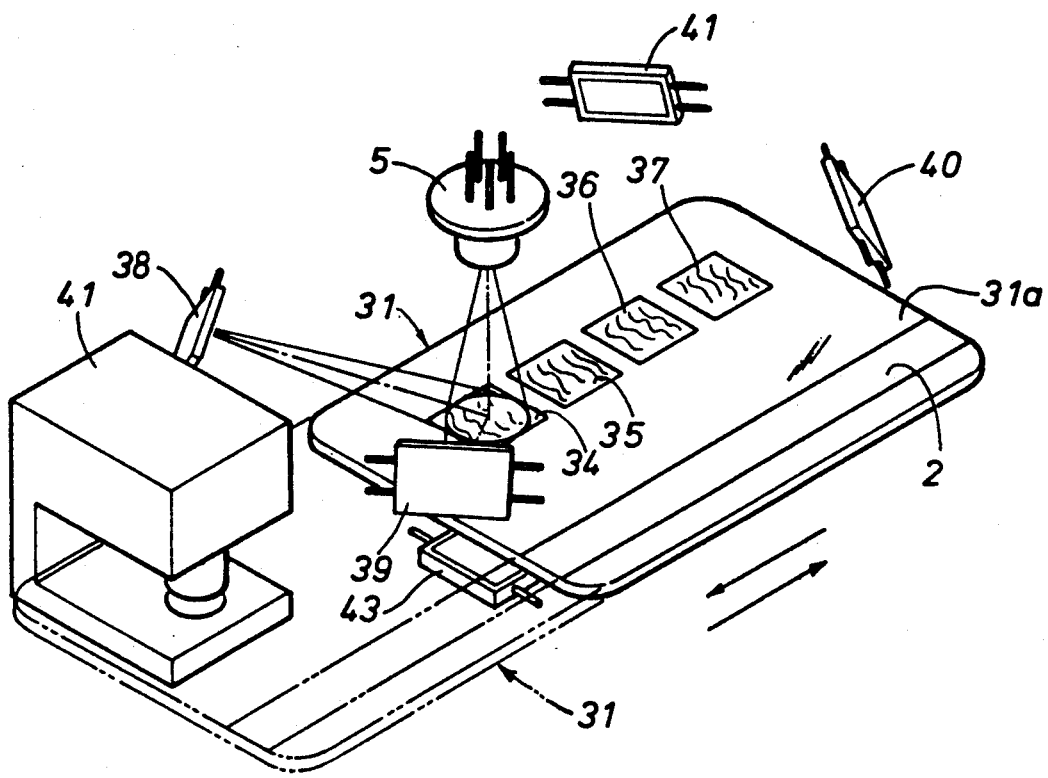
FIG. 6 is a view similar to FIGS. 4 and 5 showing a fifth embodiment of the present invention directed to the additional feature of destroying certain parts of an identification region as required.

FIGS. 4 and 5 show a fourth embodiment of the present invention. According to this embodiment, four holograph regions 34 through 37 are provided on the major surface 31a of the card 31. These holograph regions 34 through 37 are so disposed that each of the holograph regions 34 through 37 reflects the illuminating light from the light emitting element 5 and converges it upon two different points, and these points may be different from one holograph region to another. And, four light receiving elements 38 through 41 are arranged at such points. For instance, as shown in FIG. 4, the first holograph region 34 reflects the illuminating light from the light emitting element 5, and converges it upon the light receiving elements 38 and 39, but, as shown in FIG. 5, the second holograph region 35 reflects the illuminating light from the light emitting element 5, and converges it upon the light receiving elements 39 and 41, instead of the light receiving elements 38 and 39. Each of the other holograph regions 36 and 37 likewise reflects the illuminating light, and converge it upon associated two of the light receiving elements 38 through 41.

According to this embodiment, not only the forgery of the card is made even more difficult but also other applications are made possible. For instance, the reflected light from the holograph regions may be used as a coded signal associated with the condition of the card, or, alternatively, one of the holograph regions may be actually used for identifying the authenticity of the card while the other holograph regions are used for camouflage or a cover.

The light receiving elements 38 through 41 consisted of individual light receiving elements in the foregoing embodiment, but may also consist of a single multi-region photodiode. The number of the holograph regions and the number of the light receiving elements are not limited to four, and it is also possible to provide a desired number of holograph regions having different reflection properties on the surface of the card, and a corresponding number of light receiving units on the side of the card reader/writer.

Thus, according to the first through fourth embodiments, a holograph region having a unique reflection property was formed on the surface of the card, illuminating light was projected upon this holograph region by way of a reader/writer, reflected light was received by light receiving means at a prescribed position, and the authenticity of the card was determined by the intensity of this reflected light. Therefore, analysis of the holograph is so difficult and duplication of the card is so expensive that the forgery of the card is rendered substantially impossible. Further, since identification of the card can be carried out simply by projecting illuminating light upon the holograph region and detecting the intensity of the reflected light, the equipment which is required to be added to the reader/writer does not increase either its size or its complexity to any significant extent.

FIGS. 6 through 9 show a fifth embodiment of the present invention which is similar to the fourth embodiment illustrated in FIGS. 4 and 5 but is provided with an additional feature. In this embodiment, a punching unit 41 is provided in such a position as to be able to oppose each of the identification regions 34 through 37 as the card 31 is being conveyed and punch a hole in each of the identification regions 34 through 37 as required. An additional light receiving element 43 is provided so as to oppose the light emitting element 5 from the other side of the card 31 for confirming if a hole has been punched out by the punching unit 41 by cooperation with the light emitting element 5.

Figure 7:
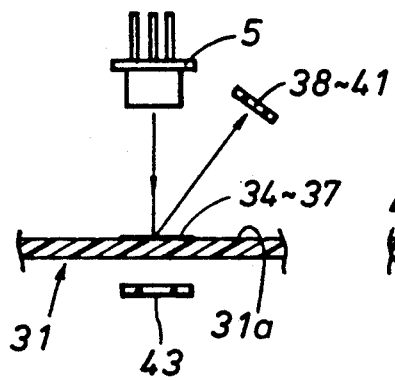
FIGS. 7-9 are fragmentary sectional views illustrating the operation of the fifth embodiment.
Figure 8:
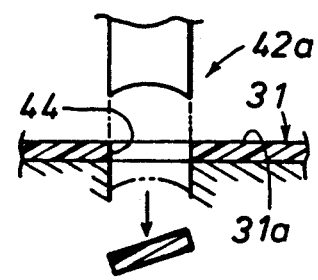
Figure 9:
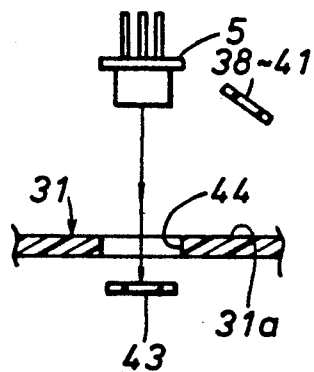

In this embodiment, the card 31 consists of a card carrying a value which is reduced by each use until the value is totally spent and the card is rendered unusable. The information on the value which the card retains is recorded as a part of the information stored in the magnetic stripe 2. When the card 31 is used by a certain amount, for instance making a purchase of goods worth a certain amount of money, a hole 44 is punched out in the identification region 34 of the card 31 by the punch 41a of the punching unit 41 as shown in FIG. 8. Thereafter, the card 31 moves to a position at which the hole 44 of the light emitting element 5 oppose each other as shown in FIG. 9, and it is determined if a hole has been punched out in the identification region 34 for the purpose of erasing this identification region 34 by projecting illuminating light from the light emitting element 5 upon the light receiving element 43 through the hole 44. As the value of the card diminishes by each prescribed amount, the associated identification regions 34 through 37 are thus erased in a sequential manner. FIG. 7 illustrates the condition in which the light receiving elements 38 through 41 receive light reflected by the holograph region but the light receiving element 43 does not receive light from the light emitting element 5 by being obstructed by the holograph region.

Therefore, even when an attempt is made to rewrite the contents of the information stored in a spent magnetic card with the intention to increase its value, since the identification regions have already been erased, it is not identified as an authentic card, and is therefore unusable. Since the erased parts contain holograph regions which are not easy to duplicate, deceitful use of the card is not possible simply by the patching of the erased parts, and an effective prevention of such rewriting of information storage cards is made possible.

Figure 10:
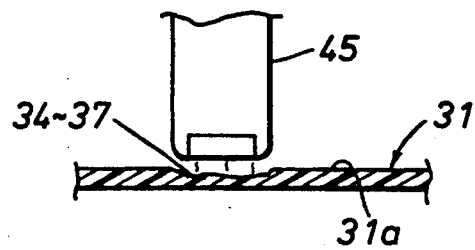
FIG. 10 is a view similar to FIG. 8 showing a sixth embodiment of the present invention.

FIG. 10 is a view similar to FIG. 8 showing a sixth embodiment of the present invention. In this embodiment, the identification regions 34 through 37 are erased by heating and melting them with a thermal head 45. This embodiment is otherwise similar to the fifth embodiment.

Thus, according to the fifth and sixth embodiments of the present invention, unauthorized rewriting of the carrier of information of a card can be effectively prevented using a simple structure since the card can be made usable when the card is spent and discarded, and unauthorized rewriting of the information stored in the card is not enough to make the card usable.

Figure 11:
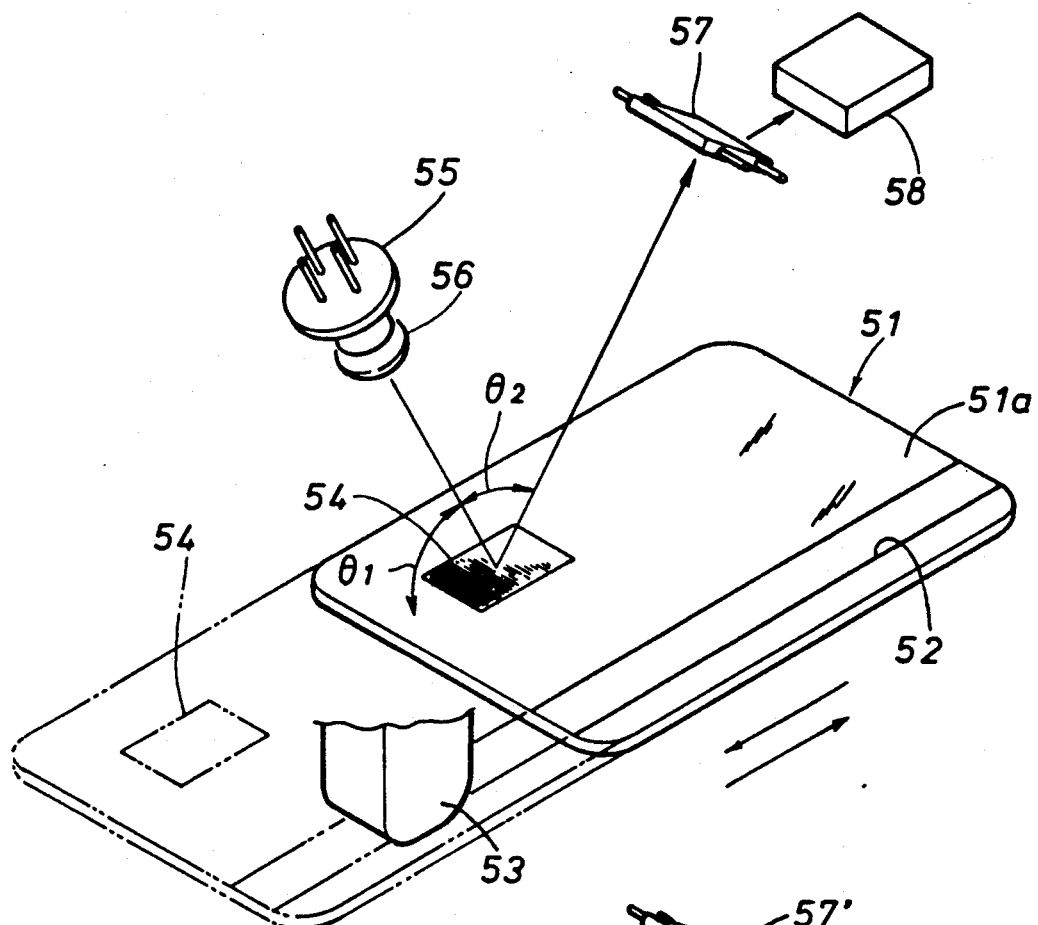
FIGS. 11-13 are perspective views showing seventh through ninth embodiments of the present invention, respectively, employing diffraction grating regions.

Referring to FIG. 11 showing a seventh embodiment of the present invention, a card 51 is conveyed in the direction indicated by the arrows or substantially laterally as seen in FIG. 11 by means of conveyer rollers or the like not shown in the drawings, and a magnetic head 53 writes into and reads out of a magnetic stripe 52 provided on a major surface 51a of the card 51 when it has reached such a position. A diffraction grating region 54 is provided in a suitable location of a major surface 51a of the card 51. This diffraction grating region 54 consists of numerous grooves having a density of several hundred grooves per mm to several thousand grooves per mm, and reflects incident light projected thereupon at an incident angle of θ1 and having a certain wave length into reflected light at a reflective angle of θ2 with respect to the incident light.

The reader/writer is provided with a light emitting element 55 as a means for projecting laser light perpendicularly upon the major surface 51a thereof upon the diffraction grating region 54 from a certain distance away therefrom. This light emitting element 55 projects illuminating light upon the diffraction grating region 54 at an angle θ1 when the card 51 is at the location indicated by the solid lines in FIG. 11. A lens 56 is interposed between the diffraction grating region 54 and the light emitting element 55 to convert the light emitted from the light emitting element 55 into a parallel beam of light directed upon the diffraction grating region 54. Further, a light receiving element 57 consisting of a photodiode is disposed at a position for receiving the light emitted from the light emitting element 55 and reflected by the diffraction grating region 54. An identification circuit 58 is connected to the light receiving element 57 to determine the authenticity of each card.

In carrying out such a card identification process, the card 51 is inserted in the card reader/writer, and illuminating light from the light emitting element 55 is projected upon the diffraction grating region 54. The authenticity of the card 51 can be identified when the light reflected by the diffraction grating region 54 is collected by the light receiving element 57, and its intensity is detected to be of a certain level by the identification circuit 58. Therefore, even when a forger obtained such a card, not only it would be difficult for him to analyze the diffraction grating but also a significant cost is required to fabricate an identical diffraction grating. Thereby, it offers a strong discouraging effect upon potential forgers.

Figure 12:
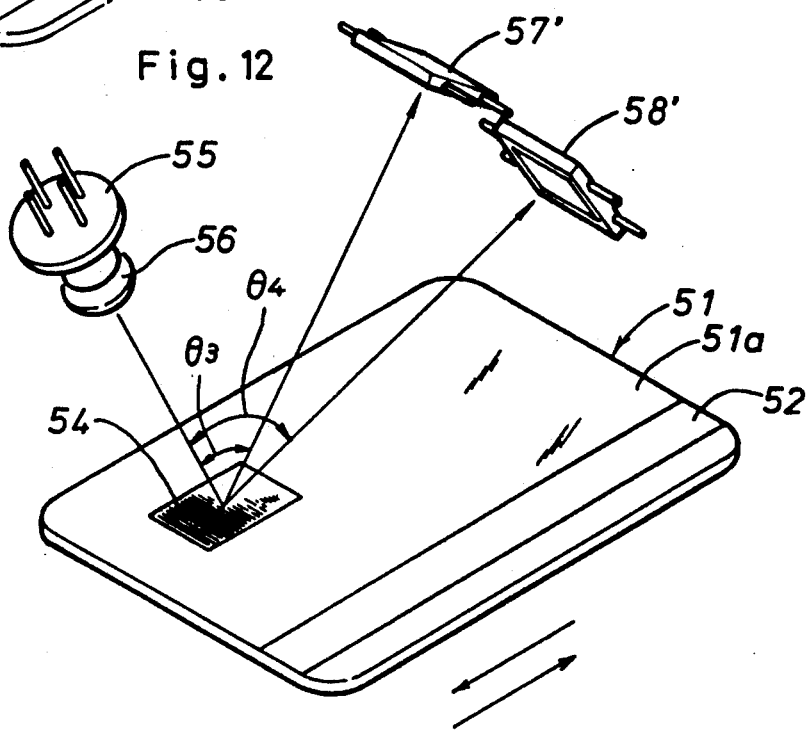

FIG. 12 is a view similar to FIG. 11 showing an eighth embodiment of the present invention, and like parts in these drawings are denoted with like numerals without repeating detailed description thereof. According to this embodiment, the light emitting element 55 incorporates therein a pair of light sources having different wave lengths, and for instance may consist of a two-wave length laser device incorporating a plurality of chips in a single package. Further, a pair of light receiving elements 57' and 58' are provided at positions which are at certain angles θ3 and θ4, respectively, with respect to the central axial line of the illuminating light so as to correspond to the respective wave lengths of the illuminating light and at a certain distance away from the diffraction grating region 54. Thus, according to this embodiment, the card 51 is identified to be authentic only when the intensities of the light received by the light receiving elements 57' and 58', respectively, are both higher than a certain prescribed level. This embodiment is otherwise similar to the seventh embodiment.

Figure 13:
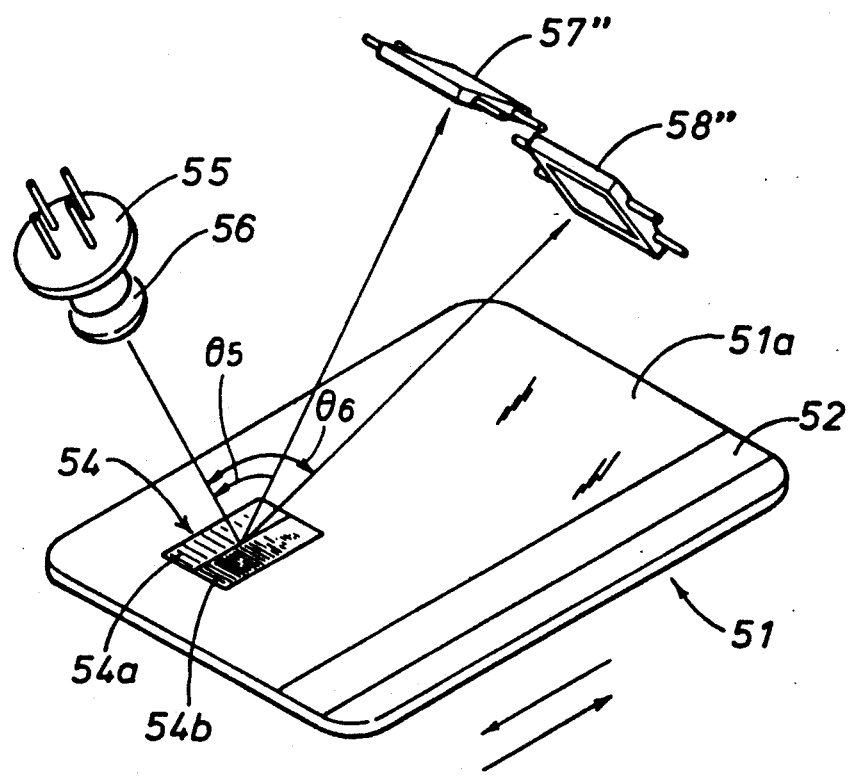

FIG. 13 is a view similar to FIGS. 11 and 12 showing a ninth embodiment of the present invention. In this embodiment, the diffraction grating region 54 provided on the major surface 51a of the card 51 is divided into two diffraction grating parts 54a and 54b having different reflective properties. Light receiving elements 57" and 58" are placed in the card reader/writer so as to correspond to the diffraction grating parts 54a and 54b, respectively, or at angles θ5 and θ6, respectively, with respect to the central optical line of the illuminating light, and spaced from the diffraction grating region 54.

Thus, according to this embodiment, the illuminating light emitted from the light emitting element 55 and reflected by the diffraction grating region 54 is received by the light receiving elements 57" and 58", and the card 51 is identified to be authentic only when the intensities of the light received by the light receiving elements 57" and 58", respectively, are both higher than a certain prescribed level. Therefore, this embodiment has an even stronger discouraging effect on potential forgers of the card. This embodiment is otherwise similar to the seventh and eight embodiments.

Figure 14:
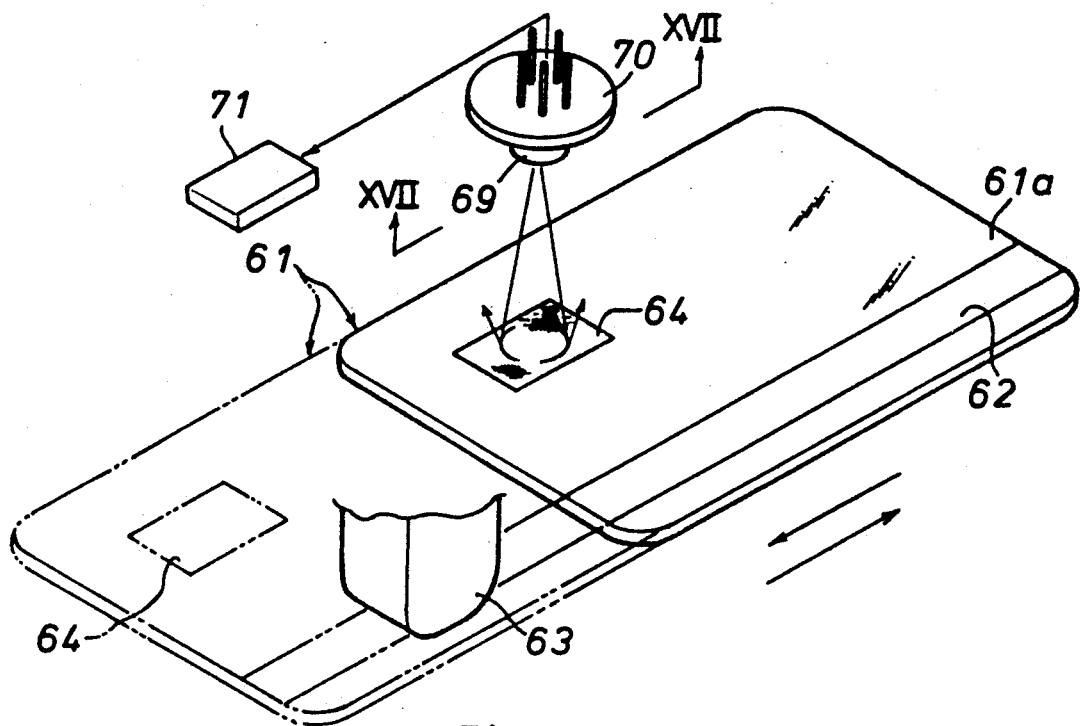
FIG. 14 is a perspective view showing a tenth embodiment of the present invention employing a large number of fine grooves formed on the information storage card.
Figure 15:
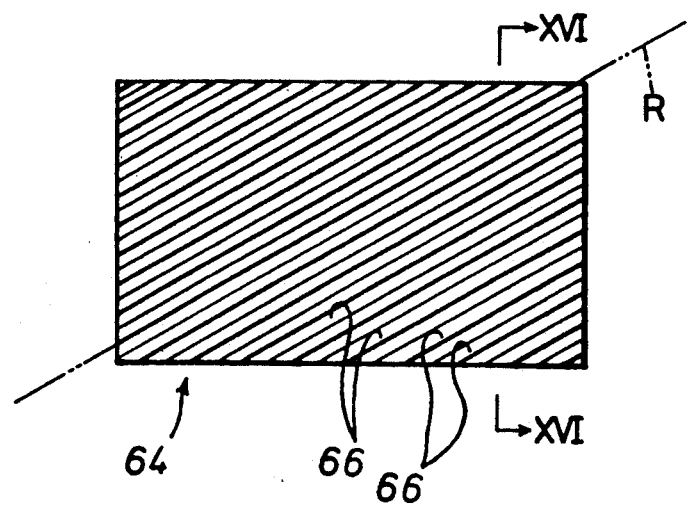
FIG. 15 is an enlarged plan view of the identification region shown in FIG. 14.
Figure 16:
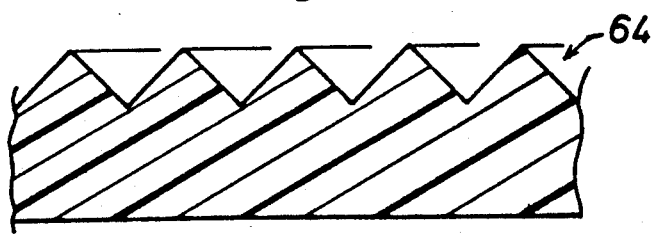
FIG. 16 is an enlarged sectional view taken along line XVI-XVI of FIG. 15.

Referring to FIG. 14 showing a tenth embodiment of the present invention, a card 61 is conveyed in the direction indicated by the arrows or substantially laterally as seen in FIG. 14 by means of conveyer rollers or the like not shown in the drawings, and a magnetic head 63 writes into and reads out of a magnetic stripe 62 provided on a major surface 61a of the card 61 when it has reached such a position. An identification region 64 is provided in a suitable location of the major surface 61a of the card 61. As illustrated in FIGS. 15 and 16, this identification region 64 consists of a large number of parallel V-grooves 66 extending in the direction indicated by the imaginary line R at the density of several grooves per mm to several hundred grooves per mm.

Figure 17:
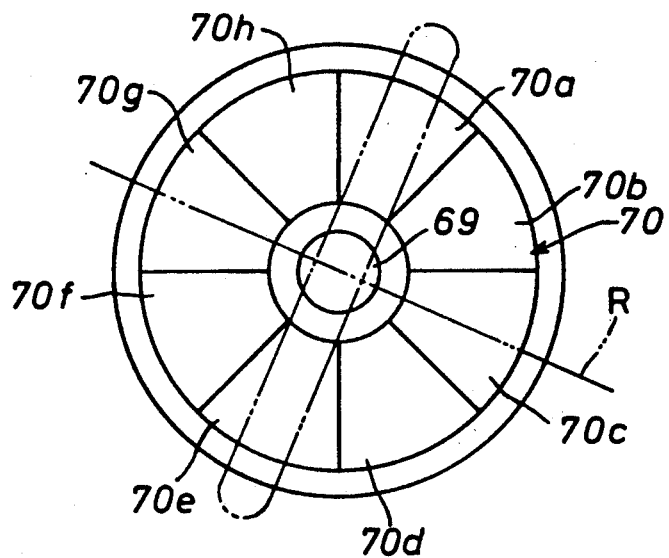
FIG. 17 is an end view as seen in the direction of arrows XVII-XVII of FIG. 14.

The reader/writer is provided with a light emitting element 69 as a means for projecting laser light perpendicularly to the major surface 61a thereof upon the identification region 64 from a certain distance away therefrom when the card 61 has reached the position indicated by the solid lines in FIG. 14. A light receiving element 70 consisting of a multi-region photodiode comprising a large number of light receiving surfaces 70a through 70h surrounding the light emitting element 69 is provided as illustrated in FIG. 17. An identification circuit 71 is connected to the light receiving element 70 to determine the authenticity of each card.

In carrying out such a card identification process, the card 61 inserted in the card reader/writer is retained perpendicularly to the light emitting element 69, and illuminating light from the light emitting element 69 is projected upon the identification region 64. The authenticity of the card 61 can be identified when the light reflected by the identification region 64 impinges upon the light receiving surfaces 70a and 70e of the light receiving element 70 as illustrated in FIG. 17, or as analeptic pattern extending perpendicularly to the direction of the (imaginary line R) of the grooves 66, and this is detected by comparing the positional relationships of those light receiving surfaces (the light receiving surfaces 70a and 70e) receiving light of high intensity. Therefore, even when a forger obtained such a card, not only it would be difficult for him to analyze the identification region but also a significant cost is required to fabricate an identical identification region. Thereby, it offers a strong discouraging effect upon potential forgers.

Figure 18:
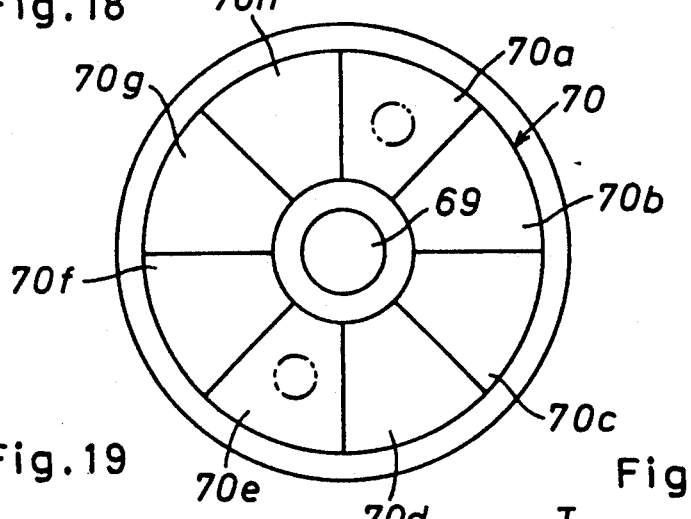
FIG. 18 is a view similar to FIG. 17 showing an eleventh embodiment of the present invention.

FIG. 18 shows an eleventh embodiment of the present invention. In this embodiment, the identification region consists of a diffraction grating region having a large number of grooves at the density of several thousand grooves per mm, and is designed to converge the light from the light emitting element 69, for instance, on parts 70a and 70e as spots of light. This embodiment may be conveniently utilized for the embodiments illustrated in FIGS. 11 through 13.

Figure 19:
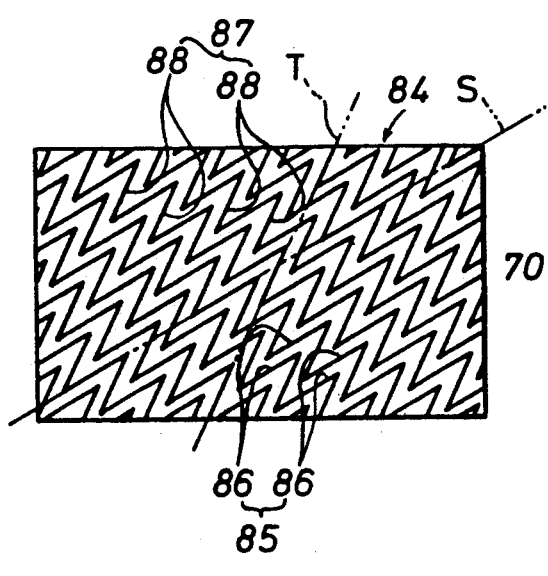
FIG. 19 is a view similar to FIG. 15 showing a twelfth embodiment of the present invention.
Figure 20:
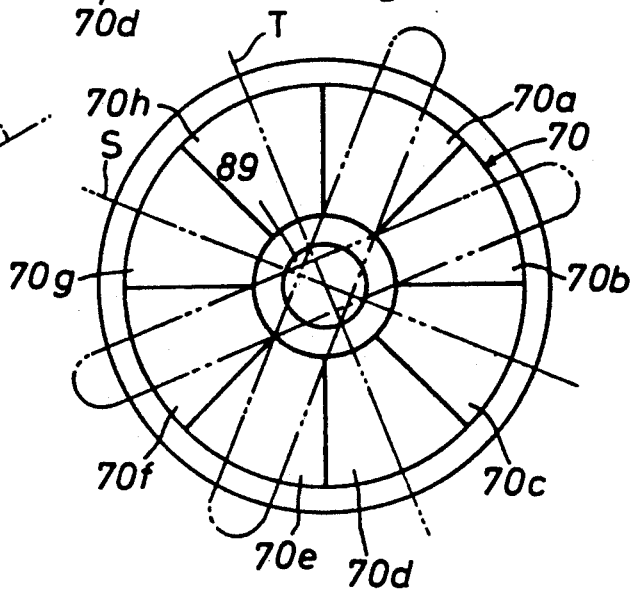
FIG. 20 is a view similar to FIG. 17 showing a light receiving element for the twelfth embodiment of the present invention.

FIGS. 19 and 20 are views similar to FIGS. 15 and 16, respectively, to show a twelfth embodiment of the present invention. In this embodiment, the identification region 84 consists of a combination of a first set 85 of parallel V-grooves 86 extending in the direction of the imaginary line S and a second set 87 of parallel V-grooves 88 extending in the direction of the imaginary line T which is different from the aforementioned direction. Accordingly, the authenticity of the card 61 can be identified when the light reflected by the identification region 64 impinges upon the light receiving surfaces 70a through 70h of the light receiving element 70 as a pair of elliptic patterns extending perpendicularly to the directions (imaginary lines S and T) of the grooves 86 and 88 as illustrated in FIG. 20, and this is detected by comparing the positional relationships of those light receiving surfaces (the light receiving surfaces 70a, 70e, 70b, and 70f) receiving light of high intensity. This embodiment is otherwise similar to the eleventh embodiment.

Figure 21:
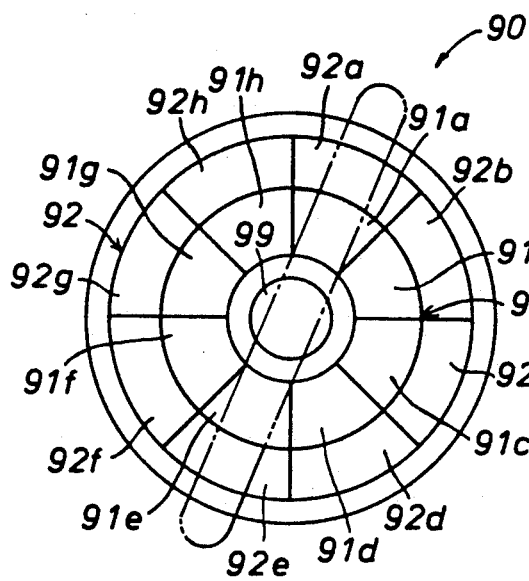
FIGS. 21 and 22 are views similar to FIG. 20 showing a light receiving element for a thirteenth embodiment of the present invention employing a large number of parallel grooves in two different conditions.
Figure 22:
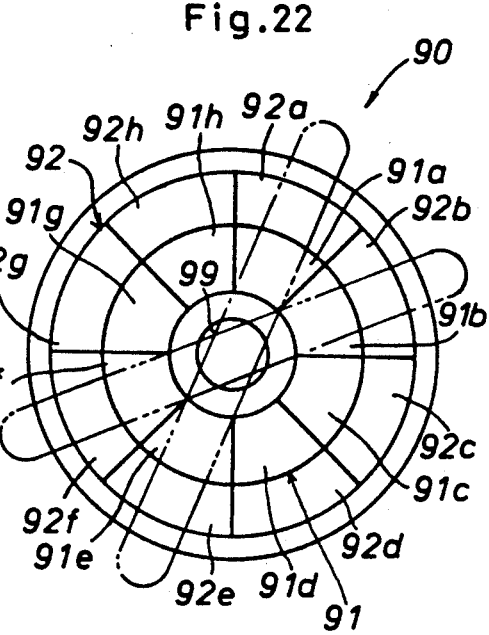
Figure 23:
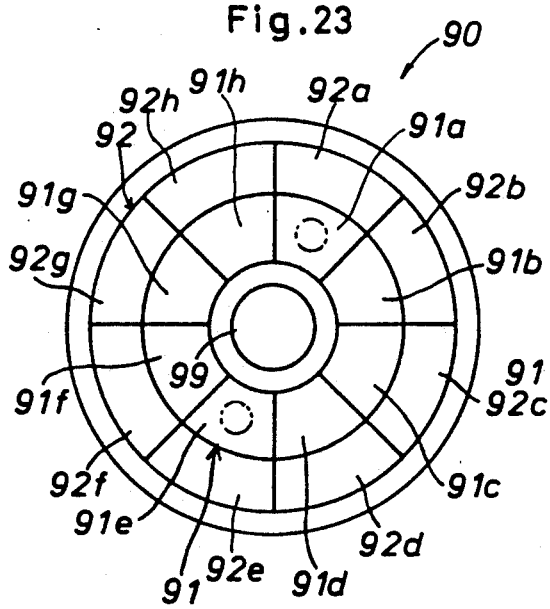
FIGS. 23 and 24 are views similar to FIGS. 21 and 22, respectively, for the thirteenth embodiment of the present invention in which a diffraction grating region is used instead of a large number of parallel grooves.
Figure 24:
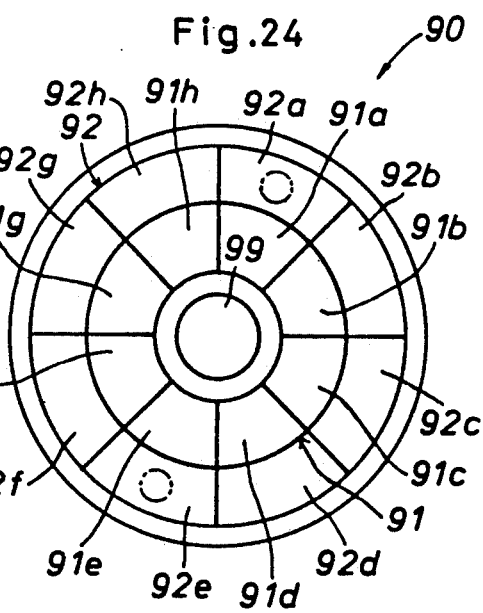

FIGS. 21 through 24 show a thirteenth embodiment of the present invention. According to this embodiment, the light receiving element 90 comprises a first set 91 of light receiving surfaces 91a through 91h surrounding the light emitting element 99, and a second set 92 of light receiving surfaces 92a through 92h. Therefore, this embodiment can not only identify identification patterns like those of the tenth and twelfth embodiments as illustrated in FIGS. 21 and 22 by using a multiplicity of parallel grooves but also allows a greater variation of the identification patterns to increase the difficulty of forging the card. When a diffraction grating region is used instead of grooves, corresponding light spots are formed, for instance, on the light receiving surfaces 91a and 91e of the first set 91 of the light receiving element 90 or on the light receiving surfaces 92a and 92e of the second set 92 surrounding the first set 91 as illustrated in FIGS. 23 or 24, as the case may be. This embodiment also allows a certain amount of information to be individually written into the identification region of the card beside from the normal carrier of information of the information storage card, and to be read out therefrom.

Figure 25:
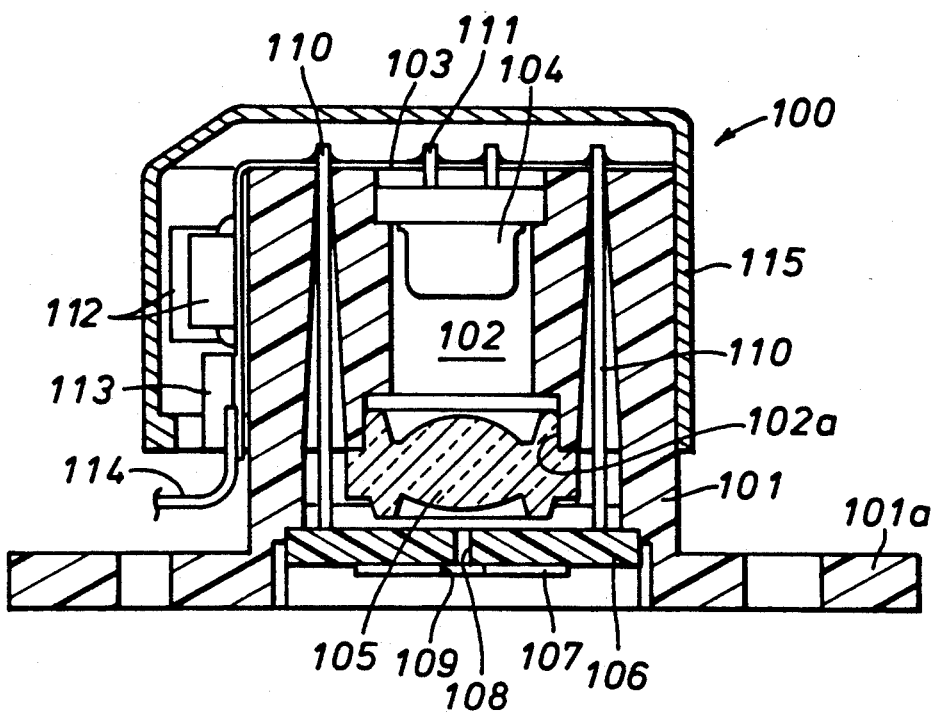
FIG. 25 is a sectional view of an optical head according to the present invention.
Figure 26:
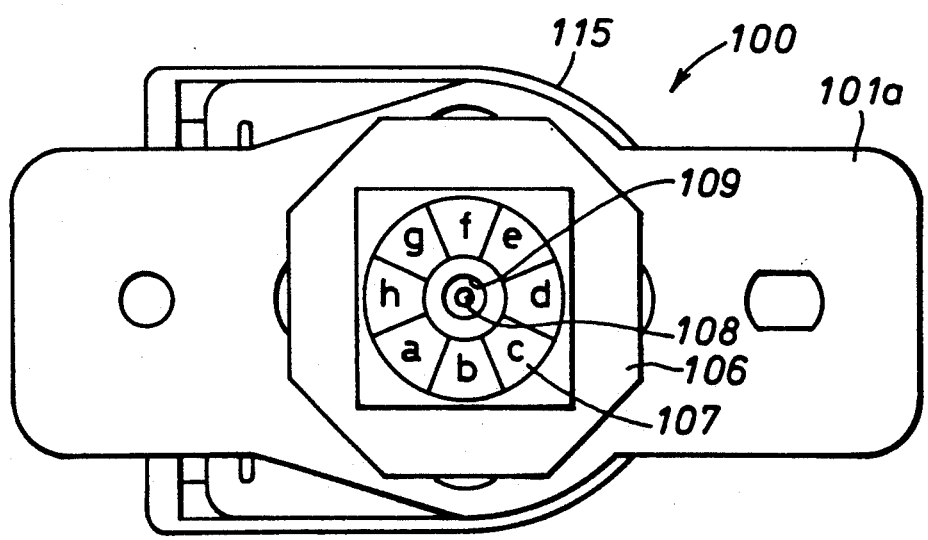
FIG. 26 is a bottom view of the optical head.

FIGS. 25 and 26 show a preferred embodiment of the optical head according to the present invention. This optical head 100 comprises an annular casing 101 made of synthetic resin and provided with a flange 101a at a bottom end thereof, a light emitting element 104 consisting of a semiconductor laser device at a top end of a central bore 102 defined in the casing 101, and a lens 105 fixedly fitted into an enlarged part 102a of the central bore 102 in a lower part thereof.

The bottom end of the central bore 102 is closed by a circuit board 106 having an octagonal shape as illustrated in FIG. 26. A semiconductor chip 107 consisting of a silicon chip is mounted on the bottom surface of the circuit board 106. The circuit board 106 is provided with a central opening 108 for allowing a light beam emitted from the light emitting element 104 and collimated by the lens 105 to pass through.

The Central opening 108 of the circuit board 106 serves as a diaphragm which limits the aperture of the lens 105.

The semiconductor chip 107 is divided into eight sectors 107a through 107h of an equal size, and is provided with a central opening 109 which is coaxial with the opening 108 of the circuit board 106 and is larger in diameter than the opening 108. Each of the sectors 107a through 107h is formed as an individual photodiode.

A flexible circuit board 103 is attached to an axial upper end surface of the casing 101 remote from the flange 101a, and a part of the flexible circuit board 103 extends along a side of the casing 101. Pins 110 connected to the sectors 107a through 107h of the semiconductor chip 107 along with pins 111 extending from the light emitting element 104 are soldered to appropriate parts of the flexible circuit board 103. The flexible circuit board 103 carries various circuit elements 112, and lead wires 114 are connected to appropriate parts of the circuit formed on the flexible circuit board 103 via a connector 113.

According to the present invention, the light receiving surface may be simply divided into a plurality of sectors 107a through 107h arranged around the central opening 109 as illustrated in FIGS. 17, 18 and 20, or, alternatively, may be divided into two or more rows of sectors arranged around the central opening 109 as illustrated in FIGS. 21 through 24.

Obviously, the present invention is not limited by the above embodiments but there are other possible variations. For instance, although the illuminating light was projected from the light emitting element upon the identification region with a lens interposed therebetween in the above described embodiments, mirrors and prisms may be placed in the light path to change the direction of the light path. A photodiode was used as the light receiving element in the above embodiments, but a position sensing device (PSD) may also be used. A position sensing device consists of a semiconductor device comprising a high resistivity Si i-layer, a p-layer formed on one side thereof or on its light receiving surface, and a n-layer formed on the other side of the i-layer, and a current proportional to the position of a light spot projected on the light receiving surface is produced from electrodes provided on the light receiving surface. Further, although a reflection type identification region was formed on the major surface of the card in the foregoing embodiments, it is also possible to place a similar region on both the surfaces of the card, or to form a transmission type identification region by providing a transparent part in a part of the card.

Although the present invention has been described in terms of specific embodiments, it is possible to modify and alter details thereof without departing from the spirit of the present invention.

What is claimed is:

1. An optical head for optically determining the authenticity of an article by impinging a light beam upon an identification region provided on said article and having a selected reflective directivity, and receiving light reflected by said identification region, comprising:
    an annular casing defining a central bore therein;
    a light emitting element received at one end of said central bore and having a light emitting surface thereof facing interior of said central bore, said light emitting surface providing a coherent beam of light;
    a lens provided in an intermediate part of said central bore;
    a generally planar mounting means provided at an other end of said central bore remote from said one end, said mounting means including a generally planar array of photodiodes mounted on a surface thereof facing away from said light emitting element whereby said photodiodes do not receive direct light from said light emitting element, and an opening for allowing said coherent light beam emitted from said light emitting element to pass therethrough; and
    said array of photodiodes arranged around said opening with each of said photodiodes being capable of individually detecting a magnitude of light reflected from a said identification region of a said article and impinged thereon.

2. An optical head according to claim 1, wherein said photodiodes are arranged in two rows around said central opening.

3. An optical head according to claim 1, wherein said central opening serves as a diaphragm.

4. An optical head according to claim 1, wherein said light emitting element consists of a semiconductor laser device.

5. An optical head according to claim 1, wherein said light receiving element comprises a circuit board, and a semiconductor chip mounted on one surface of said circuit board, said photodiodes formed on said semiconductor chip.

6. An optical head according to claim 1, wherein said identification region consists of a holograph, a diffraction grating or a multiplicity of parallel grooves.

7. An optical head according to claim 1 further comprising a circuit board attached to said one end of said annular casing, said light emitting element mounted on said circuit board via leads of said light emitting element, said photodiodes including leads which are passed through the annular casing and electrically and mechanically connected to said circuit board.

8. An optical head according to claim 7 wherein said circuit board consists of a flexible circuit board which is provided with an extension extending along a side of said annular casing and carrying at least one circuit element for one of said light emitting element and light receiving element.

9. An optical head according to claim 1 wherein said planar array of photodiodes comprises a single wafer having a central opening therein passing through said wafer, said array of photodiodes disposed around said central opening.

10. An optical head for optically determining the authenticity of an article by impinging a light beam upon an identification region provided on said article and having a selected reflective directivity, and receiving light reflected by said identification region comprising:
    a casing;
    a light emitting element providing a coherent beam of light and mounted within said casing;
    a generally planar mounting means including an aperture formed therein, said aperture disposed in a light path of said coherent light beam for enabling said coherent light beam to pass therethrough; and
    a generally planar array of photodiodes mounted on said mounting means, said photodiodes facing away from said light emitting element whereby said photodiodes do not receive direct light from said light emitting element, said planar array of photodiodes arranged around an axial center line of said coherent light beam, each of said photodiodes adapted to individually detect light reflected from a said identification region of a said article and impinged thereon.

* * * * *